United States Patent
Beaumont

(10) Patent No.: US 9,632,747 B2
(45) Date of Patent: Apr. 25, 2017

(54) TRACKING RECITATION OF TEXT

(71) Applicant: LENOVO (Singapore) PTE, LTD., New Tech Park (SG)

(72) Inventor: Suzanne Marion Beaumont, Wake Forest, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 103 days.

(21) Appl. No.: 14/182,951

(22) Filed: Feb. 18, 2014

(65) Prior Publication Data

US 2015/0234635 A1    Aug. 20, 2015

(51) Int. Cl.
| | | |
|---|---|---|
| *G10L 21/00* | (2013.01) | |
| *G06F 3/16* | (2006.01) | |
| *G06F 3/0485* | (2013.01) | |
| *G06F 3/0484* | (2013.01) | |
| *G10L 15/22* | (2006.01) | |

(52) U.S. Cl.
CPC ............ *G06F 3/167* (2013.01); *G06F 3/0485* (2013.01); *G06F 3/04845* (2013.01); *G10L 15/22* (2013.01)

(58) Field of Classification Search
None
See application file for complete search history.

(56) References Cited

U.S. PATENT DOCUMENTS

| | | | | |
|---|---|---|---|---|
| 6,017,219 A | * | 1/2000 | Adams, Jr. ............... | G09B 7/04 434/178 |
| 8,311,808 B2 | * | 11/2012 | Tinkler ............... | G06F 17/2715 704/1 |
| 2003/0028378 A1 | * | 2/2003 | August et al. ............... | 704/260 |
| 2004/0243416 A1 | * | 12/2004 | Gardos ................... | G10L 15/25 704/275 |
| 2011/0144978 A1 | * | 6/2011 | Tinkler ............... | G06F 17/2715 704/10 |
| 2014/0039887 A1 | * | 2/2014 | Dzik ....................... | G10L 15/26 704/235 |

* cited by examiner

*Primary Examiner* — Marcus T Riley
(74) *Attorney, Agent, or Firm* — Kunzler Law Group

(57) ABSTRACT

For tracking a recitation of text, a method is disclosed that includes displaying, by use of a processor, a segment of text, receiving an audio signal, and indicating a position in the segment of text determined by a correspondence between the audio signal and the segment of text.

14 Claims, 9 Drawing Sheets

TRACKING RECITATION OF TEXT

BACKGROUND

Field

The subject matter disclosed herein relates to computing devices and more particularly relates to using a computing device for tracking recitation of text.

Description of the Related Art

In some example, various computing devices may scroll a text being read aloud by a reader. The computing device may scroll the text at a given rate, but this scroll rate may not be consistent with the reader. If the reader desires a slower or faster read rate, the reader must configured the computing device accordingly. Furthermore, the scroll rate may get ahead of the reader and the computing device may not be aware of this.

In another example, when reading text aloud on a computing device, a reader may be distracted and temporarily look away from the computing device. It may be difficult for the reader to find his/her place after return to a display of the computing device.

BRIEF SUMMARY

An apparatus for tracking recitation of text is disclosed. In one embodiment the apparatus includes a processor and memory that stores code executable by the processor. In one embodiment, the code includes code that displays a segment of text, code that receives an audio signal, and code that indicates a position in the segment of text determined by a correspondence between the audio signal and the segment of text. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
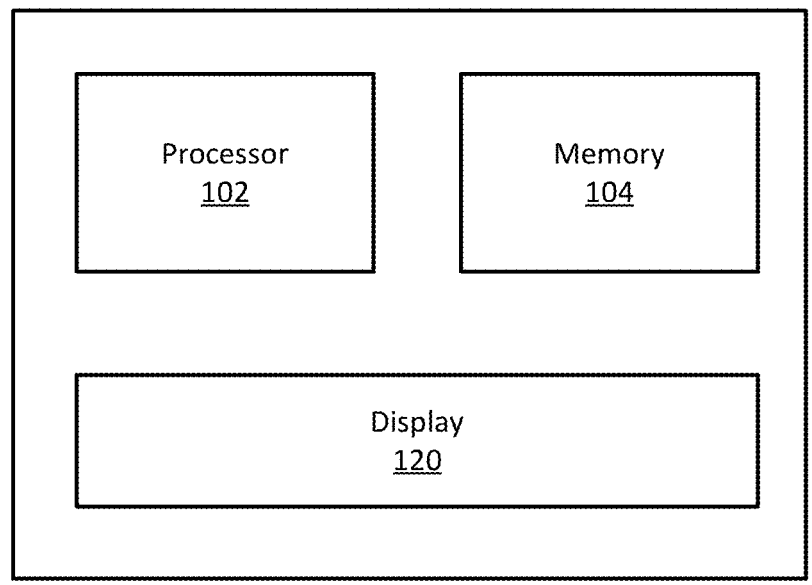
FIG. 1 is a schematic block diagram illustrating one embodiment of an apparatus for tracking recitation of text.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment 100 of an apparatus for tracking recitation of text. In one embodiment, the apparatus may include a processor 102, memory 104, and a display 120.

In one embodiment, the processor 102 may include any kind of microprocessor. The processor 102 may operate based on any number of bits. For example, the processor 102 may be 8-bit, 16-bit, 32-bit, 64-bit, or other bits, or the like. The processor 102 may include multiple processing cores. The processor 102 include any kind of instruction set. For example, an instruction set for the processor 102 may include a CISC, RISC, or other, or the like. Of course, a wide variety of different processors may be used and this disclosure is not limited in this regard.

The memory 104 may, in certain embodiments, include any kind of memory architecture, memory technology, memory size, or the like. The memory may be volatile memory or non-volatile memory. Volatile memory may include SRAM, DRAM, TTRAM, A-RAM, Z-RAM, ETA RAM, or other, or the like. Non-volatile memory may include ROM, flash memory, magnetic storage, optical storage, paper tape, punched cards, or the like. Non-volatile memory technologies may include FeRAM, CBRAM, PRAM, SONOS, RRAM, Racetrack memory, NRAM, Millipede, or other, or the like. Of course, many different types of memory may be used and this disclosure is not limited in this regard.

The display 120, in certain embodiments, may include a wide variety of display technologies, devices, architectures, or the like. The display 120 may include an electronic visual display, a flat panel display, a liquid crystal display, refreshable Braille display, volumetric display, or the like. The display 120 may include CRT, LED, ELD, E Ink, PDP, LCD, HPA, TFT, OLED, SED, Laser TV, Carbon nanotubes, Quantum dot display, Interferometric modulator display, or other, or the like. Of course, many different display types or technologies may be used and this disclosure is not limited in this regard.

In one embodiment, the apparatus 100 includes a computing device that includes the processor 102. In one embodiment, the memory 102 may include code executable by the processor. In another embodiment, the code includes code that displays a segment of text.

In one embodiment, the display displays text. The text may include letters, characters, sentences, paragraphs, chapters, compositions, books, weblogs, tweets, posts, emails, text messages, or other, or the like. The text may include figures, drawings, images, or other, or the like. In one example, the display 120 may display an entire composition of text. For example, the display may display a poem, or other short composition.

In another example, the display 120 may show a segment of the composition. For example, the segment of text may be a portion of a large composition, such as, but not limited to, a book, a paper, a research project, a story, a novel, or other, or the like. Therefore, in certain embodiments, the display 120 may display a portion of the text or may not concurrently display the entire text.

In one embodiment, the display 120 may be adjustable by a user. In one example, the display 120 may include a scrollbar. A user may adjust the scrollbar to change the segment of text being displayed. For example, a user may move the scrollbar upwards to display a prior segment of the text. In another example, a user may move the scrollbar downwards to display a subsequent segment of the text.

In other embodiments, the display may show the segment of text in different colors, sizes, or the like. A color or size of text being displayed may be modifiable by a user.

In another embodiment, the code may receive an audio signal. An audio signal may be transmitted in many different ways and this disclosure is meant to include all such ways. In one embodiment, the code may receive an audio signal by receiving input from a microphone, or other sensor capable of sensing sound. For example, a person may read a text and the code may receive the spoken words through a microphone (FIG. 2: 202) of the apparatus.

In another example, the code may receive an audio signal by receiving a digital transmission over a network. For example, an audio signal may be in a file and the code may receive the file over the network. In another example, the code may receive an audio signal by receiving a stream of media content over a network.

A network, as described herein, is meant to include all kinds of networks, including, but not limited to, coax, Ethernet, wired, wireless, cellular, data, local area networks, wide area networks, peer to peer networks, or other, or the like.

In another embodiment, the code may indicate a position in the segment of text determined by a correspondence between the audio signal and the segment of text. In one example, the audio signal may be a verbalization of at least a portion of the segment of text. A person may verbalize a portion of the text and the code may receive the verbalization of the text, the code may then indicate a position based on matching words between the text and the words spoken by the person.

In one embodiment, the code indicates the position in the segment of text based on word similarity. For example, the segment of text may include "Jack ran fast up the hill." The verbalization may include "Jack ran really fast up the hill." Therefore, although there may be differences between the segment of text and a verbalization of the segment of text, the code may still indicate a position in the segment of text based on the similar words "jack", "ran", "fast", "up", and "hill."

In another example, a segment of text may include "Jack and Jill went up the hill." A verbalization may include "Jill and Jack went up the hill." The code may determine a position in the segment of text based on word similarity although the words may not exactly match.

In another embodiment, the code may indicate the position in the segment of text based on a threshold number of matching words. For example, a threshold number of matching words may be six. Therefore, in certain embodiments, where six or more words match between a segment of text and text included in an audio signal, the code may indicate the position in the segment of text. For example, the segment of text may include "The first three months of the year are January, February, and March." The audio signal may include "the first three months of the," and the code may indicate a position in the segment of text at the matching words. In another example, the code may indicate a position in the segment of text immediately following the matching words. In the preceding example, the code may indicate the position at the word "year."

In one embodiment, the code may indicate the position in the segment of text using an indicator selected from the group consisting of changing a font characteristic, highlighting, changing contrast, underlining, and blinking. In one embodiment, a font characteristic may include bold, italics, strikethrough, subscript, superscript, size, case, color, font type, or other, or the like. Therefore, in certain examples, the code may alter any graphical feature of a text in order to distinguish the text from other text.

In one example, the code may indicate a position in the segment of text by highlighting a number of recently matched words. In another example, the code may indicate the position in the segment of text by highlighting a word following words received in the audio signal. For example, the segment of text may include "Mary walked to work." The audio signal may include "Mary walked to," and the code may highlight the word "work" which follows the text received in the audio signal. Of course the code may also change a font characteristic of the word "work," change the color of the word "work," change a background color for the word "work," underline the word "work," change the size of the word "work," bold the word "work," italicize the word "work," blink the word work, or modify the word "work" in any other way so that the word "work" (the next word to be spoken) may be more readily identified by a person reading the segment of text, for example.

In another embodiment, text corresponding to text in the audio signal may not be displayed on the display. Therefore, in certain embodiments, the code may scroll a display for the segment of text in order to move corresponding text onto a current display. In one example, text in an audio file may match a portion of text, however, the portion of text may not be in the currently displayed portion of the segment of text. In this example, code may scroll the display in order to bring the corresponding text into text displayed on the display.

In another embodiment, the code may scroll a display for the apparatus 100 to center the corresponding text in the segment of text. For example, where corresponding text may be located on an upper or a lower portion of the screen, the code may move the text up or down in order to move corresponding text to the center of the screen. This may make the corresponding text easier to locate by a viewer of the display. Of course, the code may move corresponding text from other locations such as, but not limited to, a left portion, a right portion, a corner portion, behind other applications, or other, or the like.

In another embodiment, the code may provide an interface to allow a user to reset a search function for the apparatus. For example, the code may provide a graphic button that may reset the search function for the apparatus. In one example, code may search the segment of text for corresponding words. In one example, the code may search from a previous position, a previous correspondence, or the like. Therefore, in response to a user action, such as a button being clicked, the code may search from a beginning of the segment of text.

For example, the segment of text may include "How much wood would a woodchuck chuck if a woodchuck could chuck wood? A woodchuck would chuck as much wood as he could if a woodchuck could chuck wood!" In this example, the code may have indicated a prior correspondence after the words "as he could." In response to receiving an audio signal that includes the words "woodchuck could," the code may indicate the correspondence after that position. In response to a user clicking on a reset button, the code may indicate an earlier "woodchuck could." (Words 13 and 14 in this example).

In another embodiment, the apparatus may provide a pause function to a user. In response to a user selecting the pause function, the apparatus may ignore words in an audio signal. As in the previous example, in response a user selecting the pause function, the code may not indicate a position in the segment of text based on text received in an audio signal.

In another example, the apparatus may receive a click at another location on the display, and the code may search for corresponding text start from the location that was clicked.

In another embodiment, the apparatus may store a current location in the segment of text. Therefore, in certain examples, when the code begins to execute, the code may restore a location from a previous instantiation.

Figure 2:
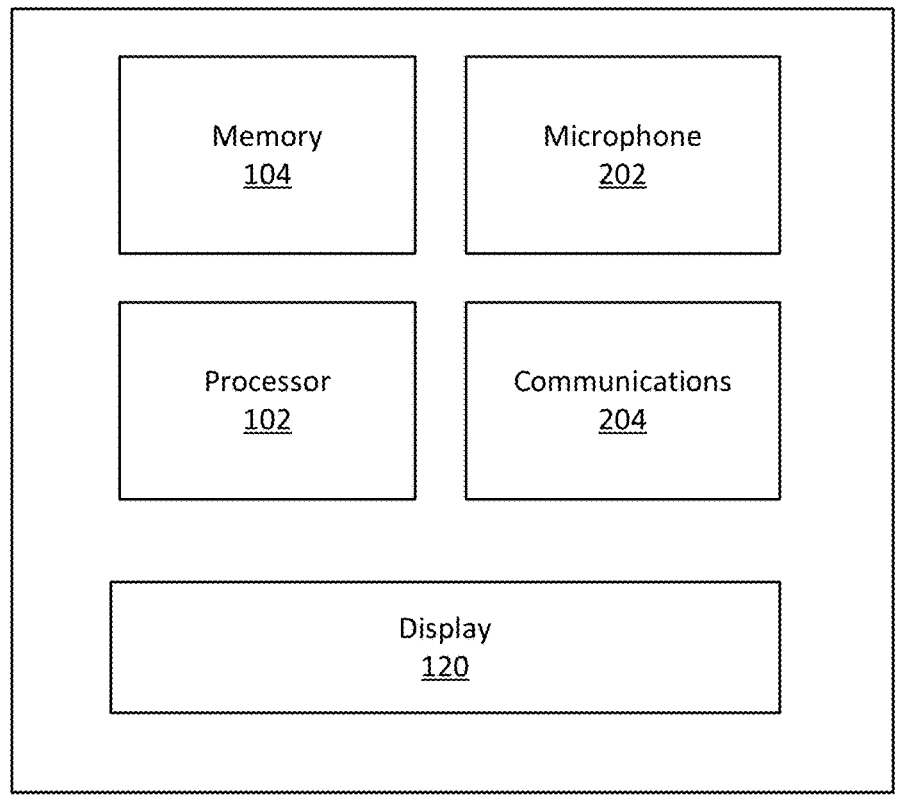
FIG. 2 is a schematic block diagram illustrating one embodiment of an apparatus for tracking recitation of text.

FIG. 2 is a schematic block diagram illustrating one embodiment 200 of an apparatus for tracking recitation of text. In one embodiment, the apparatus includes a processor 102, memory 104, a display 120, and a microphone 202, and communications module 204. The processor 102, memory 104, and display 120 may or may not be substantially similar to those depicted in FIG. 1.

In one embodiment, the microphone 202 may be any device capable of receiving sound and converting the sound to an electrical signal. The microphone 202 may be based on any available microphone type, including, but not limited to, a condenser microphone, a dynamic microphone, a carbon microphone, a piezoelectric microphone, a fiber optic microphone, a laser microphone, a liquid microphone, a MEMS microphone, or other, or the like. The microphone 202 may implement any pattern, such as, but not limited to, omnidirectional, unidirectional, cardioid, bi-directional, shotgun, boundary, PZM, or other, or the like. This disclosure is meant to include all microphone types and patterns and is not limited in this regard.

In another embodiment, the communications module 204 may receive an audio signal by reading the audio signal from a storage device. A previously described, a storage device may include any kind of storage device, and this disclosure is not limited in this regard. For example, an audio signal may be stored on an optical storage device, and the communications module 204 may read the audio signal from the optical storage device.

In another embodiment, the communications module 204 may receive an audio signal by receiving a file that includes the audio signal over a network. For example, a network file server may store one or more files that include audio signals. In this example, the communications module 204 may read a file from the network file server.

In one embodiment, the communications module 204 may receive an audio signal by receiving a stream of data from a media server. In one example, the apparatus 200 may request an audio signal and the media server may transmit the audio signal to the communications module 204.

In one embodiment, the communications module 204 may receive an entire audio signal and may process the audio signal sequentially. This may result in a recorded audio signal being replayed at the apparatus 200. In another embodiment, the communications module 204 may receive sequential portions of an audio signal and process the portions as received. In one embodiment, a file that includes the audio signal may be compressed. In this embodiment, the apparatus 200 may decompress the audio signal file. In another embodiment, the file may be encrypted. In this embodiment, the apparatus 200 may decrypt the file in order to access the audio signal.

In another example, the code may receive an audio signal by receiving a digital transmission over a network. For example, an audio signal may be in a file and the code may receive the file over the network. In another example, the code may receive an audio signal by receiving a stream of media content over a network.

A network, as described herein, is meant to include all kinds of networks, including, but not limited to, coax, Ethernet, wired, wireless, cellular, data, local area networks, wide area networks, peer to peer networks, or other, or the like.

Figure 3:
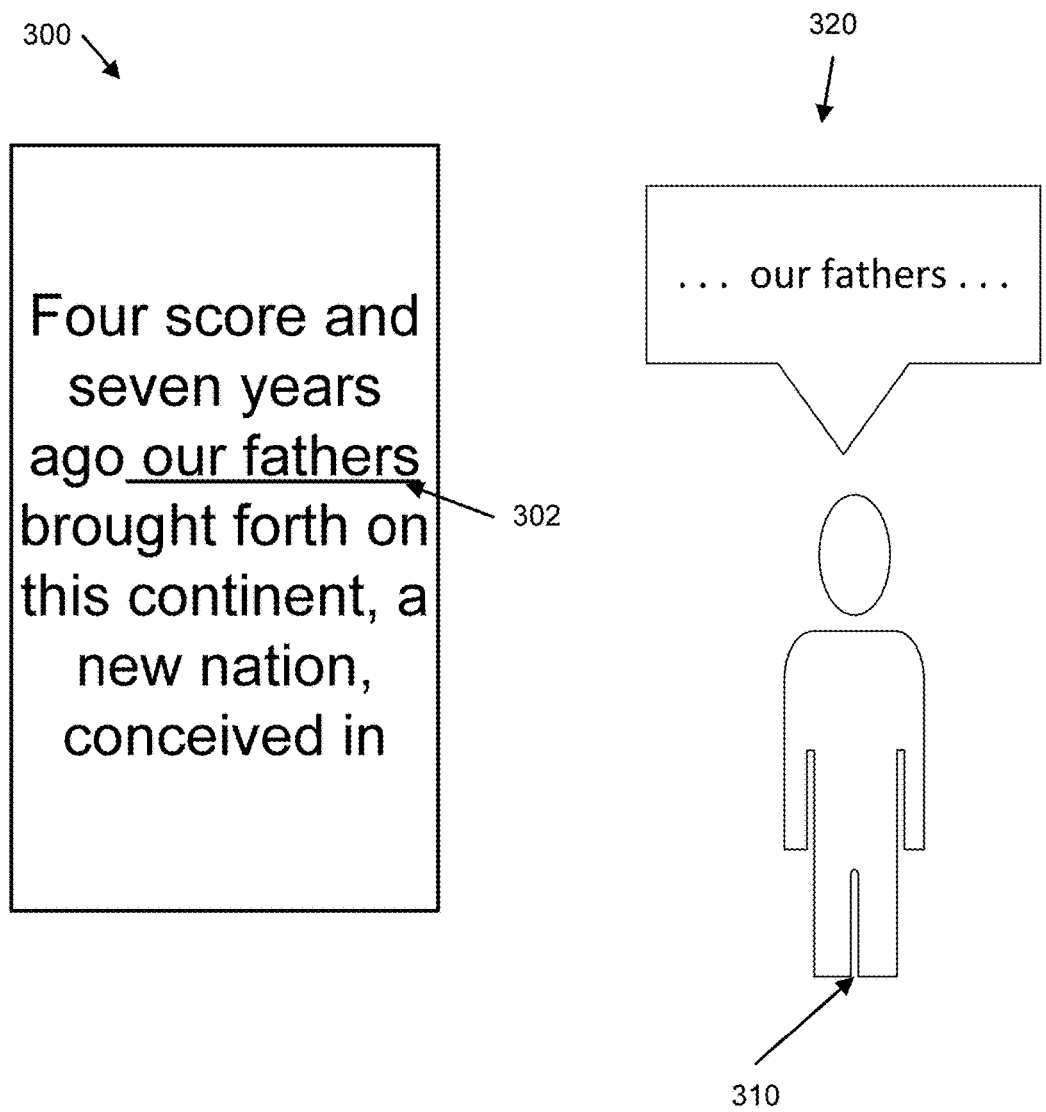
FIG. 3 is an illustration depicting one example of tracking recitation of text.

FIG. 3 is an illustration depicting one example 300 of tracking recitation of text. In one embodiment, a reader 310 may speak text nearby an apparatus 200. The apparatus 200 may receive the sound that includes the spoken text. Therefore, in certain embodiment, the audio signal by include spoken words by a reader.

In one embodiment, the apparatus 300 may display a segment of text. In one example, the segment of text may include "Four score and seven years ago our fathers brought forth on this continent, a new nation, conceived in . . . ." The apparatus 200 may receive an audio signal that includes a reader 310 reading the words "our fathers" 320. In one embodiment, the apparatus 200 may indicate the position in the segment of text determined by a correspondence between the audio signal and the segment of text. In this example, the corresponding text may be "our fathers." Therefore, in this example, code at the apparatus may indicate the position in the segment of text that includes "our fathers" 302. In this example, the corresponding text "our fathers" 302 may be indicated by underlining the corresponding text.

Figure 4:
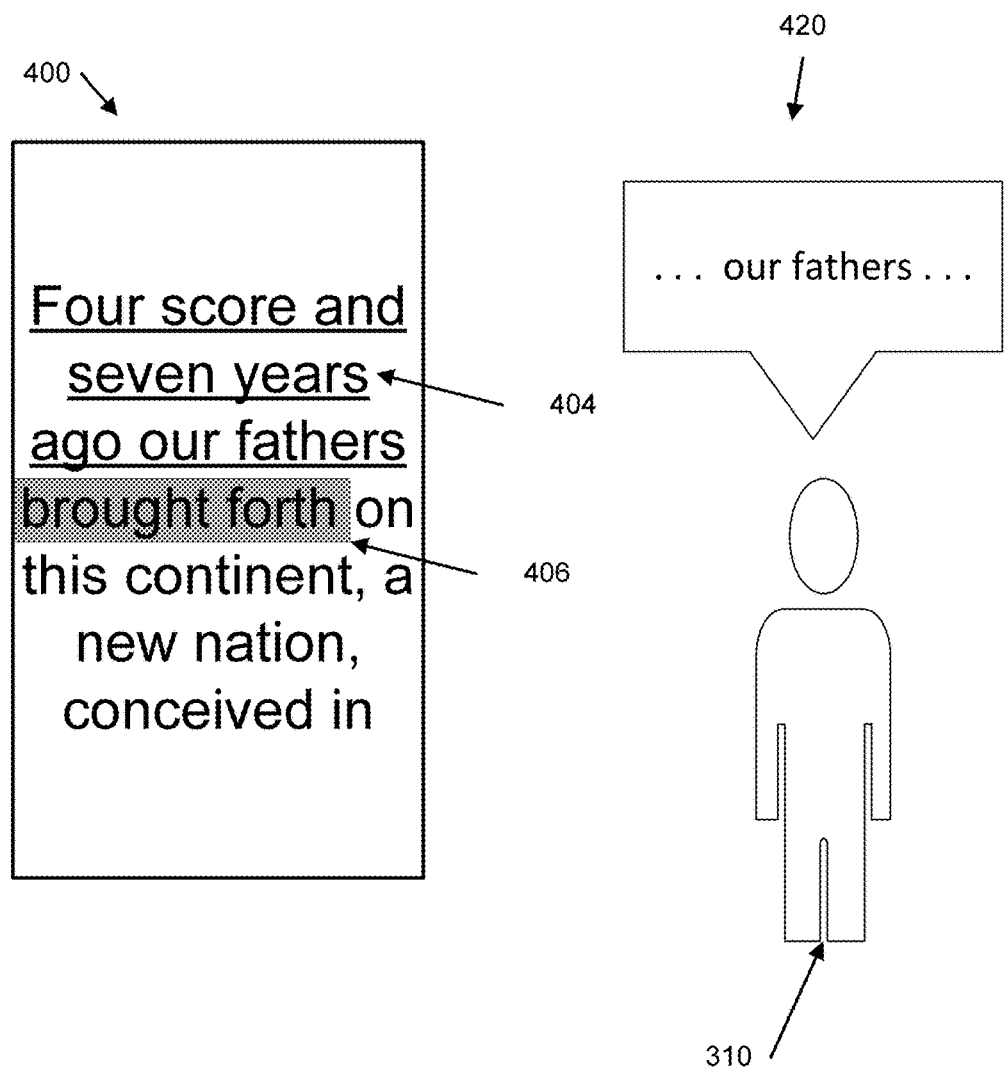
FIG. 4 is an illustration depicting one example of tracking recitation of text.

FIG. 4 is an illustration depicting one example of an apparatus 400 tracking recitation of text. In one embodiment, a reader 310 may speak text nearby an apparatus 400. The apparatus 400 may receive the sound that includes the spoken text 420. Therefore, in certain embodiment, the audio signal by include spoken words by a reader.

In one embodiment, the apparatus 300 may display a segment of text. In one example, the segment of text may include "Four score and seven years ago our fathers brought forth on this continent, a new nation, conceived in . . . ." The apparatus 200 may receive an audio signal that includes a reader 310 reading the words "our fathers" 420. In one embodiment, the apparatus 400 may indicate the position in the segment of text determined by a correspondence between the audio signal and the segment of text. In this example, the corresponding text may be "our fathers." Therefore, in this example, code at the apparatus may indicate the position in the segment of text that immediately follows "our fathers" 302. In this example, the text immediately following the corresponding text may be "brought forth" 406. The code, in this example, may indicate the text by highlighting "brought forth" 406.

In another embodiment, the apparatus 400 may indicate text 404 that previously corresponded to earlier portions of the audio signal. In one example, the apparatus 400 may indicate the text "Four score and seven years ago our fathers" 404 by underlining the previously corresponding text. Therefore, in certain embodiments, the apparatus 400, or code executing on the apparatus 400, may concurrently indicate previously corresponding text in the segment of text, and currently corresponding text in the segment of text, determined by text in the audio signal.

Figure 5:
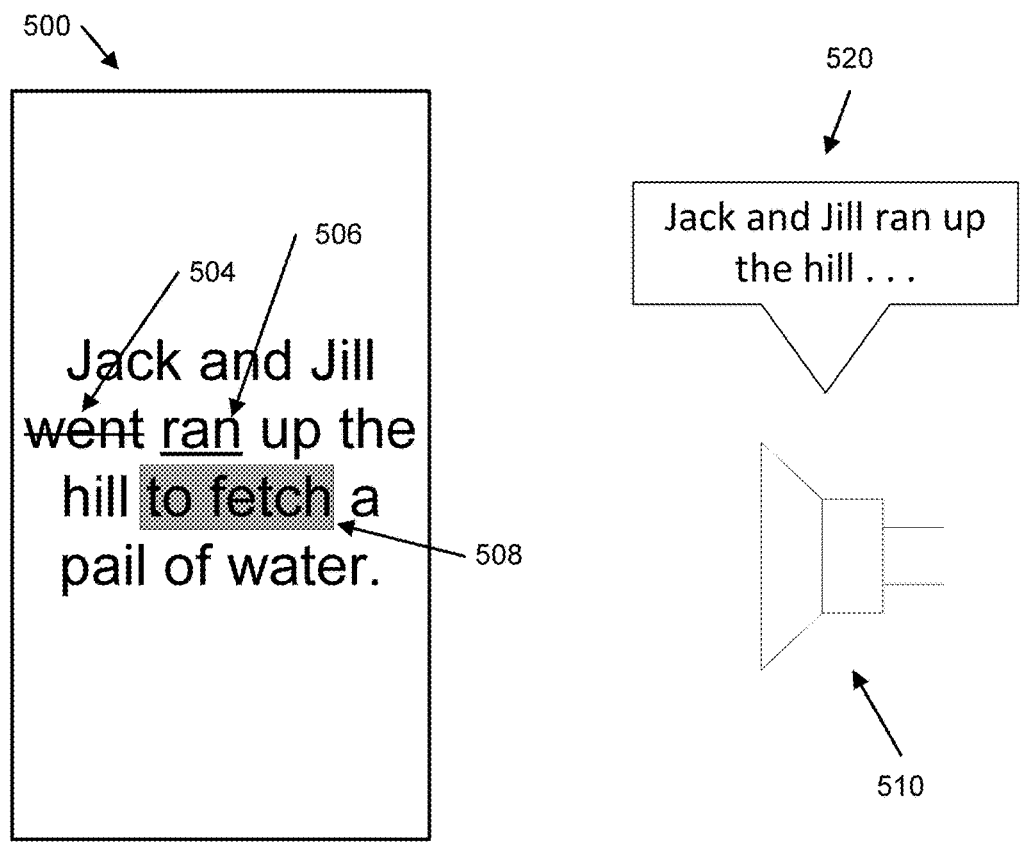
FIG. 5 is an illustration depicting one example of tracking recitation of text.

FIG. 5 is an illustration depicting one example of an apparatus 500 for tracking recitation of text. In certain embodiments, the apparatus 500 may alter the segment of text based on the text represented by the audio signal.

In one example, code may display a segment of text that includes "Jack and Jill went up the hill to fetch a pail of water." The code may receive an audio signal generated by a speaker 510. The audio signal may include the text "Jack and Jill ran up the hill . . . ." Therefore, in certain embodiments, there may be differences between the segment of text and text included in an audio signal. In this example, the segment of text includes "Jack and Jill went up the hill," while the audio signal includes the text "Jack and Jill ran up the hill." Therefore, code at the apparatus 500 may alter the word "went" to "ran."

Altering the segment of text may be based on words surrounding words to be changed. For example, the text surrounding a word to be changed may be "Jack and Jill _____ up the hill." Therefore, based on word similarity near a word discrepancy, the code may alter a word of the segment of text. In another example, the code may alter the segment of text by inserting text or removing text from the segment of text based on text included in the audio signal.

In another embodiment, the code may indicate alterations in the segment of text. In one example, the code may strike through text that has been removed from the segment of text. In another example, the code may underline text that has been added to the segment of text. In a further example, the code may indicate a position in the segment of text determined by a correspondence between the audio signal and the segment of text. In this example, the code may highlight text directly subsequent to text included in the audio signal.

Figure 6:
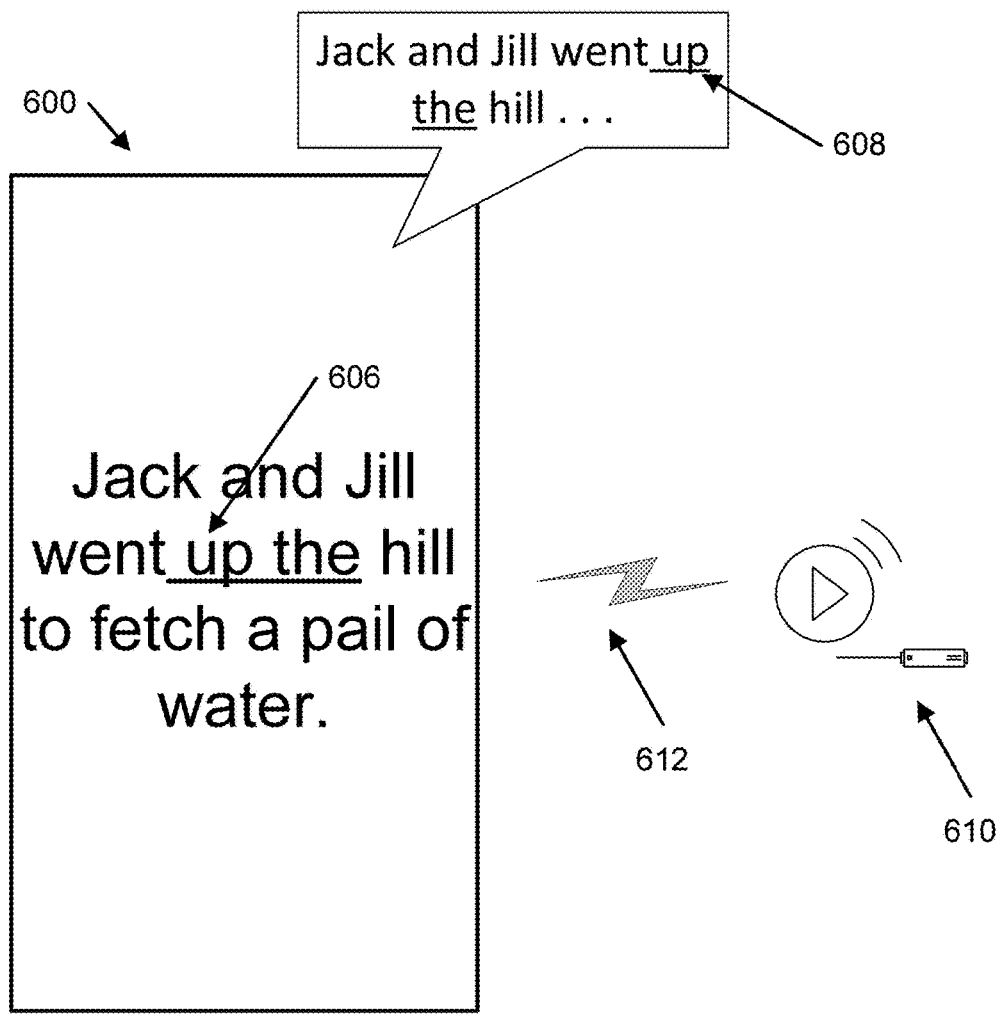
FIG. 6 is an illustration depicting one example of tracking recitation of text.

FIG. 6 is an illustration depicting one example of an apparatus 600 for tracking recitation of text. In one embodiment, the code may further generate text represented by the audio signal. In one example, the communication module 204 may receive an audio signal from a media server 610 via a communication medium 612. The media server 610 may stream audio information to the apparatus 600 in many different ways and this disclosure is meant to include all such ways. Therefore, the communication medium 612 may be wired, wireless, a local area network, a wide area network, or any other way to transmit an audio signal as one skilled in the art may appreciate.

In the example of a wireless connection, the wireless connection 612 may be a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition the wireless connection may employ a Radio Frequency Identification (RFID) communication including RFID standards established by the International Organization for Standardization (ISO), the International Electrotechnical Commission (IEC), the American Society for Testing and Materials (ASTM), the DASH7 Alliance, EPCGlobal, or the like.

Alternatively, the wireless connection may employ a ZigBee connection based on the IEEE 802 standard. In one embodiment, the wireless connection employs a Z-Wave connection as designed by Sigma Designs. Alternatively, the wireless connection may employ an ANT and/or ANT+ connection as defined by Dynastream Innovations Inc. of Cochrane, Canada.

The wireless connection may be an infrared connection including connections conforming at least to the Infrared Physical Layer Specification (IrPHY) as defined by the Infrared Data Association (IrDA). Alternatively, the wireless connection may be a cellular telephone network communication. All standards and/or connection types include the latest version and revision of the standard and/or connection type as of the filing date of this application.

In one embodiment, after receiving the audio signal, executable code may generate text based on the audio signal. In one example, the code may generate text using speech recognition. The speed recognition use a wide variety of algorithms to generate text. In another embodiment, the code may transmit the audio signal to a remote device, and receive generated text based on the audio signal. One skilled in the art may appreciate many different ways to generate text based on audio and this disclosure is not limited in this regard.

The method of claim 8, wherein the correspondence is determined using a regular expression. A regular expression as described herein may include a sequence of characters that form a search pattern. A regular expression may be as described in theoretical computer science and formal language theory. Code may generate a regular expression based on the generated text that is based on the audio signal.

For example, the apparatus 600 may display the text "Jack and Jill went up the hill to fetch a pail of water." The apparatus 600 may receive an audio signal that includes the text "Jack and Jill went up the hill." The apparatus 600 may generate text 608 based on the audio signal. The apparatus 600 may generate a regular expression that searches for the string "up the" in the segment of text. The apparatus 600 may determine a position in the segment of text where "up the" 606 matches, based on the regular expression. The apparatus 600 may indicate the position 606 in the segment of text, wherein a correspondence may be based on the result of the regular expression.

In certain embodiments, the regular expression may be created to account for misspelled words, missing words, unknown words, or the like as one skilled in the art may appreciate. The regular expression may include many different meta-characters to represent characters. For example, a "." may represent any single character. A "^" may indicate a starting point of a string to match. A "*" may represent any number or repeating characters. Braces may be used to match alternative characters. Of course, one skilled in the art may appreciate many other ways to search for matching or similar text and this disclosure is not limited in this regard.

Figure 7:
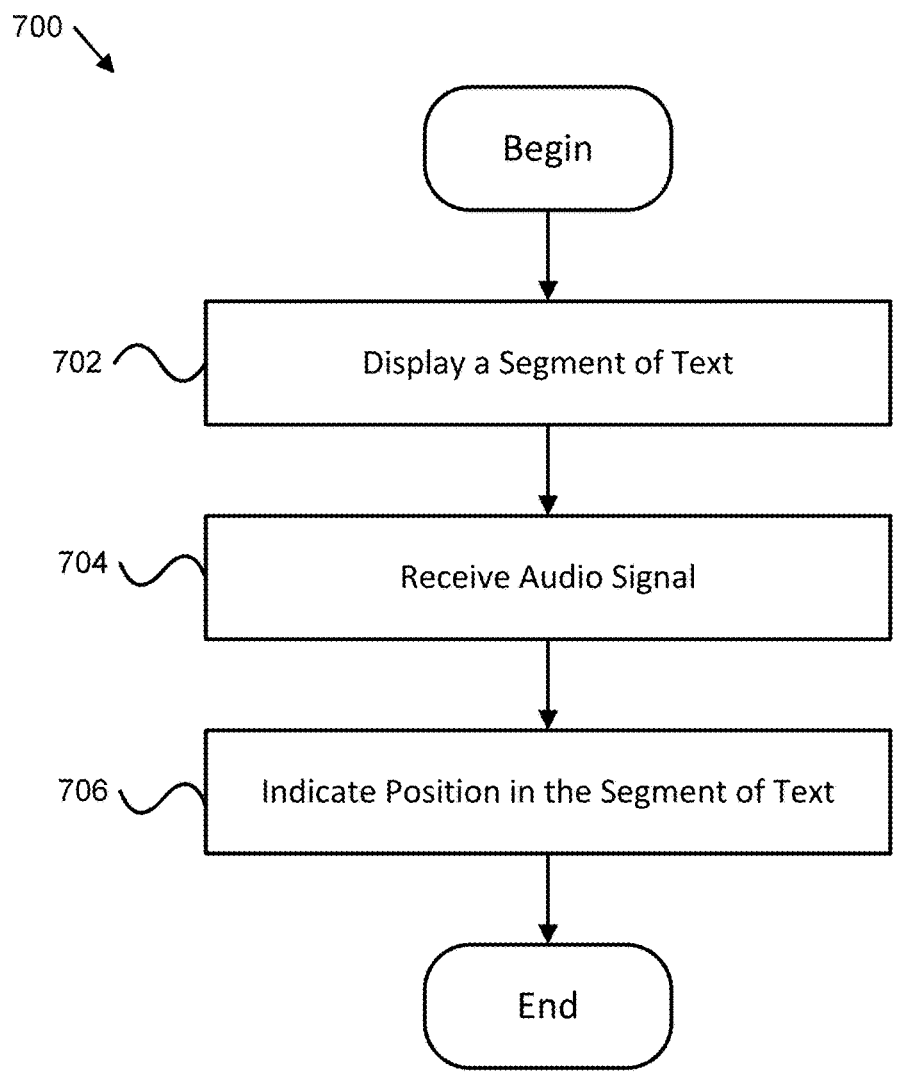
FIG. 7 is a schematic flow chart diagram illustrating one embodiment of a method for tracking recitation of text.

FIG. 7 is a schematic flow chart diagram illustrating one embodiment of a method 700 for tracking recitation of text. In one embodiment, the method 700 may begin and code may display 702, by use of a processor, a segment of text. Code may receive 704 an audio signal. Code may indicate 706 a position in the segment of text determined by a correspondence between the audio signal and the segment of text and the method 700 may end. In another embodiment of the method 700, the audio signal may be a verbalization of at least a portion of the segment of text. A verbalization as described herein may include a reader reading aloud the segment of text. A verbalization may also include a reader expressing the text in other ways, such as, singing the segment of text, rapping the segment of text, or other, or the like. Therefore, a verbalization may include a wide variety of ways a user could speak at least a portion of the segment of text.

Figure 8:
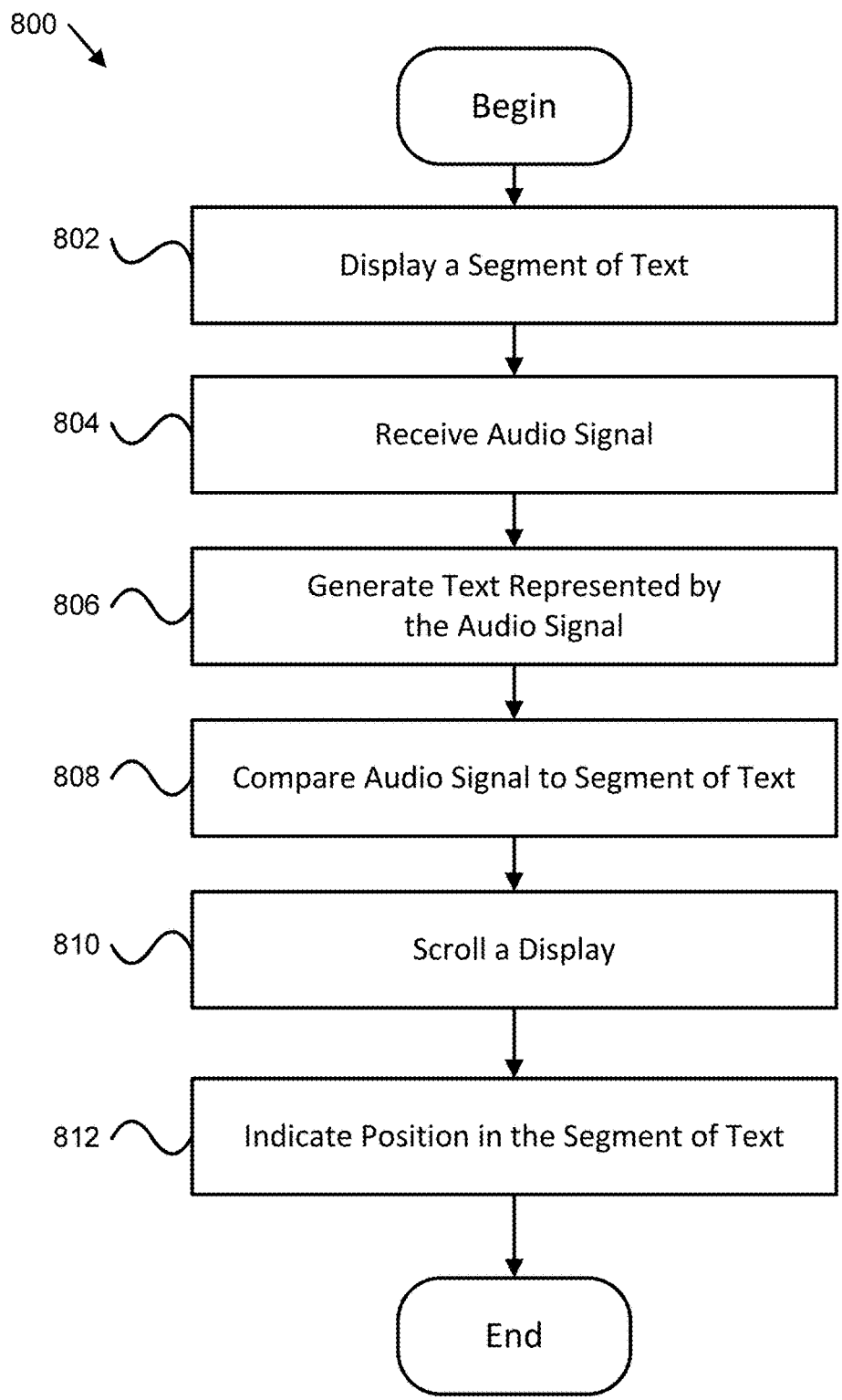
FIG. 8 is a schematic flow chart diagram illustrating one embodiment of a method for tracking recitation of text.

FIG. 8 is a schematic flow chart diagram illustrating one embodiment of a method 800 for tracking recitation of text. In one embodiment, the method 800 may begin and code may display 802 a segment of text. Code may receive 804 an audio signal. Code may generate 806 text represented by the audio signal. Code may compare 808 the generated text to the segment of text to determine if the audio signal corresponds to the segment of text. Code may scroll 810 a display for the segment of text. In another embodiment, scrolling the display may include centering the segment of text according to correspondence of a position in the audio file with the segment of text. Code may then indicate 812 a position in the segment of text determined by a correspondence between the audio signal and the segment of text and the method may end.

Figure 9:
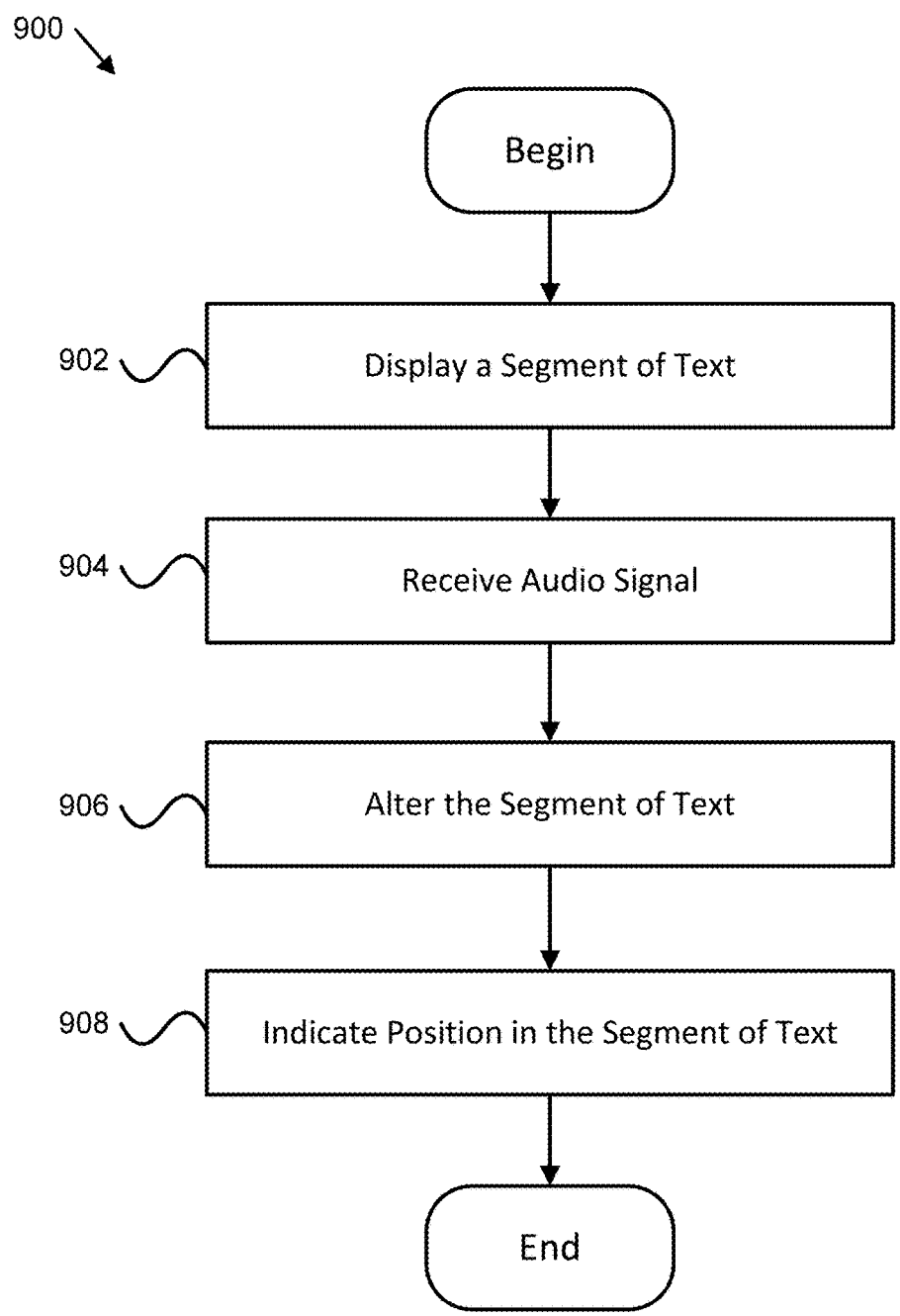
FIG. 9 is a schematic flow chart diagram illustrating one embodiment of a method for tracking recitation of text.

FIG. 9 is a schematic flow chart diagram illustrating one embodiment of a method 900 for tracking recitation of text. In one embodiment, the method 900 may begin and code may display 902 a segment of text. Code may receive 904 an audio signal. Code may alter 906 the segment of text based on the text represented by the audio signal. Code may indicate 908 a position in the segment of text determined by a correspondence between the audio signal and the segment of text and the method may end.

In other embodiments, the method may perform any and/or all functions of previously described apparatuses. For example, the method may indicate by displaying an indicator such as, but not limited to, a highlight, a changed color, a changed contrast, an underlining, a changing size, blinking, or other, or the like. Changing contrast may include changing a back ground color for the position in the segment of text. The position may include a single character, multiple characters, multiple words, or the like.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a computing device having a processor;
   a non-transitory computer readable memory that stores code executable by the processor, the code comprising:
      code that displays a segment of text;
      code that receives an audio signal comprising a verbalization of a reader reading aloud the segment of text;
      code that generates text represented by the audio signal;
      code that searches for a position in the segment of text corresponding to the text represented by the audio signal;
      code that indicates the position in the segment of text determined by the correspondence between the text represented by the audio signal and the segment of text;
      code that determines a difference between the text represented by the audio signal and the segment of text; and
      code that generates a modified segment of text based on the difference between the text represented by the audio signal and the segment of text.

2. The apparatus of claim 1, wherein the audio signal is a verbalization of at least a portion of the segment of text.

3. The apparatus of claim 1, wherein the code further indicates the position in the segment of text based on word similarity.

4. The apparatus of claim 3, wherein the word similarity comprises a threshold number of matching words.

5. The apparatus of claim 1, wherein the code indicates the position in the segment of text using an indicator selected from a group consisting of an altered font characteristic, a highlight, an altered contrast, an underline, and blinking text.

6. A method comprising:
   displaying, by use of a processor, a segment of text;
   receiving an audio signal comprising a verbalization of a reader reading aloud the segment of text;
   generating text represented by the audio signal;
   searching for a position in the segment of text corresponding to the text represented by the audio signal;
   indicating the position in the segment of text determined by the correspondence between the text represented by the audio signal and the segment of text;
   determining a difference between the text represented by the audio signal and the segment of text; and
   generates a modified segment of text based on the difference between the text represented by the audio signal and the segment of text.

7. The method of claim 6, wherein the audio signal is a verbalization of at least a portion of the segment of text.

8. The method of claim 6, further comprising comparing the audio signal to the segment of text to determine if the audio signal corresponds to the segment of text.

9. The method of claim 6, wherein the correspondence is determined using a regular expression.

10. The method of claim 6, wherein indicating the position comprises using an indicator selected from a group consisting of an altered font characteristic, a highlight, an altered contrast, an underline, and blinking text.

11. The method of claim 6, wherein indicating the position comprises scrolling a display for the segment of text.

12. The method of claim 11, wherein scrolling the display comprises centering the segment of text on the display according to correspondence of a position in an audio file with the segment of text.

13. A non-transitory program product comprising a computer readable storage medium that stores code executable by a processor to perform:
- displaying a segment of text;
- receiving an audio signal comprising a verbalization of a reader reading aloud the segment of text;
- generating text represented by the audio signal;
- searching for a position in the segment of text corresponding to the text represented by the audio signal;
- indicating the position in the segment of text determined by the correspondence between the text represented by the audio signal and the segment of text;
- determining a difference between the text represented by the audio signal and the segment of text; and
- generates a modified segment of text based on the difference between the text represented by the audio signal and the segment of text.

14. The program product of claim 13, wherein the indicating comprises an indicator selected from a group consisting of an altered font characteristic, a highlight, an altered contrast, an underline, and blinking text.

\* \* \* \* \*